United States Patent
Pell

(10) Patent No.: US 7,392,540 B1
(45) Date of Patent: Jun. 24, 2008

(54) METHODS AND SYSTEMS FOR CUSTOMER PREMISES REMOTE COLLABORATION FACILITY

(75) Inventor: Adrian Pell, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1098 days.

(21) Appl. No.: 09/678,573

(22) Filed: Oct. 3, 2000

(51) Int. Cl.
  *G06F 9/00* (2006.01)
(52) U.S. Cl. ............... 726/12; 726/11; 726/13; 726/14; 709/203
(58) Field of Classification Search ........... 713/201; 717/168–178; 726/3, 4, 11–14; 709/203
See application file for complete search history.

(56) References Cited

U.S. PATENT DOCUMENTS

| | | | | |
|---|---|---|---|---|
| 5,467,268 A | * | 11/1995 | Sisley et al. ............... | 705/9 |
| 5,802,518 A | * | 9/1998 | Karaev et al. .............. | 707/9 |
| 6,052,531 A | * | 4/2000 | Waldin et al. ............. | 717/170 |
| 6,092,194 A | * | 7/2000 | Touboul .................... | 713/200 |
| 6,199,204 B1 | * | 3/2001 | Donohue ................... | 717/178 |
| 6,217,165 B1 | * | 4/2001 | Silverbrook ............... | 347/86 |
| 2001/0054064 A1 | * | 12/2001 | Kannan .................... | 709/203 |

OTHER PUBLICATIONS

Microsoft Press, Computer Dictionary, 1997, Microsoft Press, 3rd edition, p. 197.*

* cited by examiner

*Primary Examiner*—Kambiz Zand
*Assistant Examiner*—Jacob Lipman

(57) ABSTRACT

Methods and structure of enabling secure communications between a customer computer system and a vendor support representative computer system despite firewall security on either or both systems. One embodiment provides for a collaboration center with a rendezvous service and an interaction service responsive to communications from the support representative or the customer. The rendezvous service initiates the communications between the customer and an appropriate support representative selected according to rendezvous rules provided by the vendor. Once selected, the support representative and customer systems interact by exchanging requests and responses through the interaction service using standard HTTP and Web protocols and interfaces. The communications utilize standard Web browser client programs on the respective computers and standard Web HTTP protocols that pass through typical firewall protection.

14 Claims, 8 Drawing Sheets

METHODS AND SYSTEMS FOR CUSTOMER PREMISES REMOTE COLLABORATION FACILITY

BACKGROUND OF THE INVENTION

1. Field of the Invention

The invention relates generally to vendor/customer support and management systems and in particular to improved usage of the Internet for collaborative remote support between the customer and a vendor's support representative.

2. Discussion of Related Art

It is widely known that computing systems (hardware and/or software systems) sometimes encounter problems during their operation that require remedial action. A large class of such problems are easily solved by users or customers without requiring further information or intervention by a vendor of the failing system. Such problems are frequently referred to as "self solve" problems. Other more complex problems may require assistance from knowledgeable support personnel associated with the vendor of the failing system. Typically, such knowledgeable support personnel are located in a centralized facility handling such support issues via telephone and/or computer communications.

Such support and communications from knowledgeable personnel via telephone communications give rise to number of problems. One problem in such oral support communications is obtaining correct information from a customer premises to permit reliable diagnosis and resolution of a problem. Often such information is highly technical and detailed in nature and may be difficult for a customer to readily identify and obtain on behalf of the support personnel. Further, such detailed technical information can be erroneously communicated by the customer thereby misleading the support personnel in attempts to diagnose and resolve the problem.

Other known techniques attempt to resolve the problems of oral telephonic communications for such support functions by a providing direct computer to computer communications between the customer's computing system and the support personnel of the vendor. Such a direct computer to computer communication link permits accurate retrieval of detailed technical information required by knowledgeable support personnel of the vendor. Detailed, complex technical data regarding the customer's system or use of the system can be more readily obtained by such direct computer communication techniques then by telephonic requests between support personnel and a customer. Further, the information so acquired is more likely to be technically accurate then information manually obtained and communicated orally by the customer.

Such computer to computer communication links are, in general, presently practiced in the art in accordance with one of two methods. A direct point-to-point dial-up connection using modems is a first common technique wherein both parties utilize modems and a standard telephone communication link to connect to computers. Well-known commercially available software may be used for controlling such point-to-point direct computer communication links such as pcAnywhere. Such direct modem-based communication links are often prohibited by corporate security policies within the customer's enterprise. Such security policies are intended to preclude exactly such external communications by unauthorized third parties. Further, such direct point-to-point modem communication links impose a significant burden on both the vendor's support personnel and customers to set up and configure the link for establishing and conducting the desired communications.

A second well-known computer to computer communications link technique solves some of the above problems by utilizing the Internet for the computer communications link. Use of the Internet for computer to computer communications is well-known and widely available thereby obviating the burden of configuring and managing a point-to-point modem telephonic communication link. One significant difficulty that arises even in this simpler approach is the presence of security firewalls implemented within the customer enterprise and/or the vendor's support center. These firewall devices or systems are specifically designed to prevent such incoming communications from external, unauthorized users. Most enterprises that utilize such firewall protection are unwilling or unable to alter the configuration of the firewall security to permit limited incoming computer communication links for purposes a providing support by vendor. These limitations effectively prevent direct network communications between the vendor's support personnel and the customer computers.

Similar issues arise in the context of managing a large enterprise of distributed computing systems. Even an in-house manager of such an enterprise may have difficulty accessing a remote user's computing systems for purposes of managing that system where enterprise-wide firewall security measures are implemented.

It is evident from the above discussion that the need exists for any improved communication architecture that permits flexible, convenient, reliable communications directly between the customer's computing or software systems and a vendor's knowledgeable support personnel.

SUMMARY OF THE INVENTION

The present invention solves the above and other problems, thereby advancing the state of the useful arts, by providing systems and associated methods for enabling communications between systems of the vendor's support personnel and a corresponding customer installed computing or software system. In particular, the present invention provides a technique whereby computer to computer communications is able to the use the Internet in such a manner to avoid the firewall security restrictions while maintaining desired security measures on both the vendor's enterprise and customer's enterprise. Browsers operable on the support personnel's (agent) system and the user's system exchange standard HTTP requests and corresponding responses using an intermediate interaction service. Such standard HTTP requests and responses are typically permitted through firewall protection systems to allow normal Web browsing functions.

In particular, the present invention provides for a collaboration center server system that includes a rendezvous service and an interaction service to effectuate the desired secure communications between a support center user and a customer. The support center user utilizes a standard Internet Web browser program for accessing the rendezvous service and interaction service within a collaboration center. Standard Web access is generally permitted to pass through firewall security systems and devices. In like manner, the customer utilizes a standard Web browser interface program for accessing the rendezvous service of the collaboration center.

The rendezvous service is responsible for receiving requests for collaboration directed from customers to support centers and matching these rendezvous requests in accordance with predefined rendezvous policies. For example, large customers or value added resellers might be matched with specific preassigned vendor support representatives whereas standard warranty end-user customers may be passed to the first available vendor support representative. Once the rendezvous service establishes the desired match of a vendor support representative with a requesting customer, further interaction between the customer and support representative is managed through the interaction service of the collaboration center and its corresponding interaction with the vendor support representative's browser and customer's browser. Specifically, the interaction service of the collaboration center relays requests from a customer browser through to the matched vendor support representative and similarly relays responses in the reverse direction.

A support proxy module is installed on the customer premises to act on behalf of the customer in collaborative communications with a matched vendor support representative. The support proxy module is capable of loading and executing authenticated operation modules retrieved from the collaboration center. To ensure integrity of such operation modules received from the collaboration center, digital signature technology is used to verify the origin of such an operation module received from the collaboration center for loading and operation within the customer premises. Use of a digital signature with a suitably large key size associated with the operation module makes the modules unforgeable for all practical purposes. The digital signature verification provides the customer a high degree of confidence in the origin of the module and then, by reliance upon the vendors reputation, the customer builds confidence that the operation modules do, in fact, carry out the assigned purpose and no other.

Remote control of the customer's system by the remote vendor support representative is achieved by communications through the interaction service of the collaboration center. The interaction service receives requests originating from the vendor support representative browser program and relays the requests to the support proxy module associated with the customer's browser operable in the customer premises. In order to traverse customer implemented firewall security measures successfully, requests from the support proxy module directed to the interaction service in the collaboration center contain results and responses from any previous request. In like manner, protocol responses from the interaction service directed to the support proxy include subsequent requests for loading and execution of operations modules.

A second aspect of the invention is the application of the architecture to permit remote management of a user's computer by an administrator. As noted above, remote system administration can be similarly encumbered by firewall protection within an enterprise. The same methods and structures discussed above to enable a vendor support representative to communicate with a customer through firewalls can be utilized to enable remote system management by a system administrator of a user's computing system. In-house security measures within an enterprise can be safely bypassed as described above to permit such remote administration The above, and other features, aspects and advantages of the present invention will become apparent from the following descriptions and attached drawings.

DETAILED DESCRIPTION OF THE PREFERRED EMBODIMENTS

Figure 1:
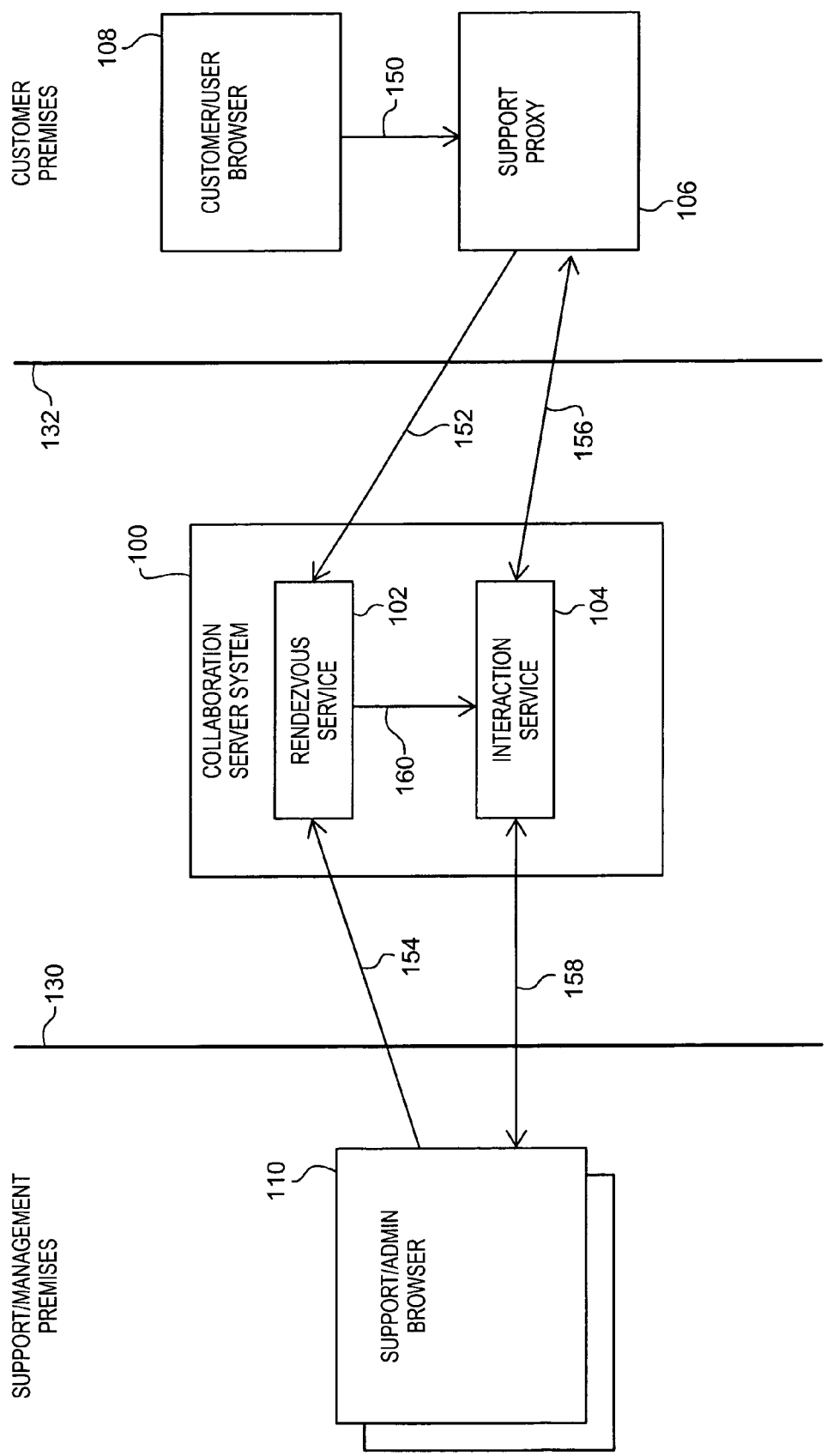
FIG. 1 is a block diagram of a system in accordance with the present invention in which an agent and user exchange information securely through firewall protection via a collaboration server system.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system and in accordance with the present invention wherein a support or administrative user (hereinafter referred to as "agent") communicates directly with the computer systems of a remote customer or user. In particular, an agent utilizes a system in the support or management premises on which a support browser 110 is operable. The support browser 110 may be any of several well-known Internet Web browsers including Netscape Navigator or Communicator or Microsoft Internet Explorer. In like manner, the customer or user operates a computer within the customer premises on which browser 108 is operable. Browser 108 may likewise be any of several well-known Internet Web browsers including Netscape Navigator or Communicator and Microsoft Internet Explorer.

Features of the present invention permit such standard Web browsers 110 and 108 to communicate directly despite the presence of firewall security measures on either or both premises. As shown in FIG. 1, the support or management premises may include firewall 130 and the customer premises may include firewall 132. Communications between the browsers is performed in accordance with the present invention utilizing standard HTTP protocol requests and responses. Such requests and responses are generally permitted to pass through standard firewall security systems to allow Internet Web browsing while selectively precluding other protocols and related ports.

The desired browser interaction is effectuated by collaboration server system 100 of the present invention. Collaboration server system 100 may physically reside anywhere in the entire Internet. In a first embodiment, collaboration server system 100 may reside at the physical site of a vendor's site within the same premises or enterprise as customer support representatives (agents) utilizing their respective systems and browsers.

In a second embodiment, collaboration server system 100 physically resides in a third party premises distinct from both the support or management premises and from the customer or user premises. In such an embodiment, collaboration server system 100 may provide a service to both the supported users and customer users in their respective premises. Such a third party service may support a large number of vendors desirous of providing such secured support services to their respective customers. In such an embodiment, collaboration server system 100 maintains a database of information (not shown) to associate particular support representatives with particular vendors and with their associated customers and users.

As shown in FIG. 1 a single agent browser 110 communicates with a single user browser 108. Those skilled in the art will readily recognize that the invention may be easily scaled to support any number of agents interacting with any number of users. Further, the invention may be easily scaled to provide services to any number of vendors as a third party service provider.

Collaboration server system 100 includes rendezvous service 102 for initiating communications between browsers 110 and 108. Once so initiated, ongoing communications between a particular customer or user and a particular agent is conducted through interaction service 104.

A customer or user operating browser 108 first initiates a request for such communications through a request for support from a support representative of a particular vendor or an administrative or management user of the enterprise. The user's support request is directed via path 150 to support proxy 106. Support proxy 106 acts on behalf of the agent to perform particular support or administrative steps within the customers premises. Use of a proxy server element in conjunction with a browser is generally well known in the art. The particular features and operation of the proxy server of the present invention is detailed further below.

In response to receipt of such a support request from the user browser 108, support proxy 106 transmits a request via path 152 to rendezvous service 102 within collaboration server system 100. The rendezvous service 102 then matches the support request with an appropriate agent operating a browser 110 in the support or management premises. In particular, the rendezvous service 102 applies rendezvous rules designed by the vendor or management premises to select one or more agents presently known to rendezvous service 102. A support or administrative user becomes known to rendezvous service 102 by issuing a request via path 154 to identify the agent as available for processing of support requests. Such a support or administrative user essentially "logs in" to the rendezvous service through such a request via path 154.

Having so identified an appropriate agent, rendezvous service 102 initiates via path 160 interaction service 104 to permit further interaction between the selected agent and the requesting customer or user. Specifically, interaction service 104 exchanges requests and responses with support proxy 106 and with the agent browser 110 via paths 156 and 158, respectively.

Figure 8:
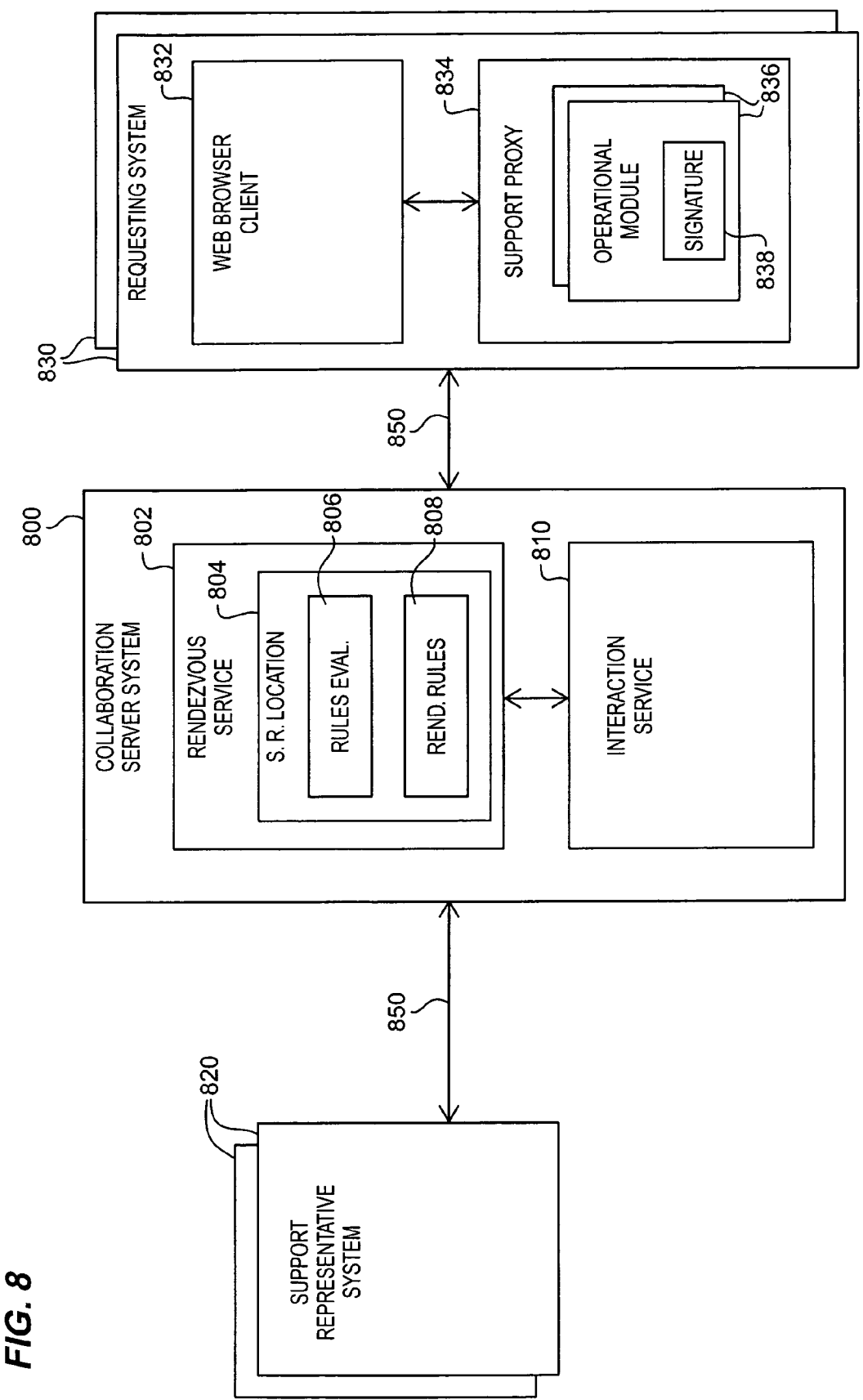
FIG. 8 is a block diagram of the system of FIG. 1 with additional structural detail revealed.

FIG. 8 is a block diagram showing additional details of the structure of the various elements of an exemplary system in accordance with the present invention. Collaboration server system 800 includes a rendezvous service 802 and an interaction service 810. Rendezvous service 802 initiates communication between a requesting system 830 and an appropriate selected support representative system 820. Interaction service 810 then performs processing necessary to continue the interaction between the two systems.

Requesting system 830 preferably uses a standard Web browser client 832 to permit a user to initiate contact with a support representative by requesting assistance from a qualified representative. A support proxy module 834 continues further interaction with a selected representative. The support proxy module 834 is directed by the support representative system 820 to load and execute operational modules 836 provided by the support system 820. Each such module includes digital signature information 838 to permit the support proxy module 834 to verify the integrity of the operational module before loading and executing it.

Upon receipt by the rendezvous service 802 of a request for assistance from a Web browser 832 on a requesting system 830, rendezvous service 802 uses service representative locator 804 to locate an appropriate service representative to handle the request for assistance. As noted herein, particular service representatives may be suited to processing of particular technical matters or may be designated for supporting particular classes of customers, etc. The locator 804 comprises a rules evaluation element 806 that evaluates the rendezvous rules 808 supplied by the vendor. As noted herein, the rules may determine a best representative in accordance with any number of factors.

The collaboration server system 800 communicates with the support representative system 820 and the requesting system 830 using standard HTTP requests and responses through Internet 850. Such standard requests and responses are capable of passing through most standard firewall protection systems. In this manner, the present invention permits collaborative communications between the support representative system 820 and the requesting system 830.

Figure 2:
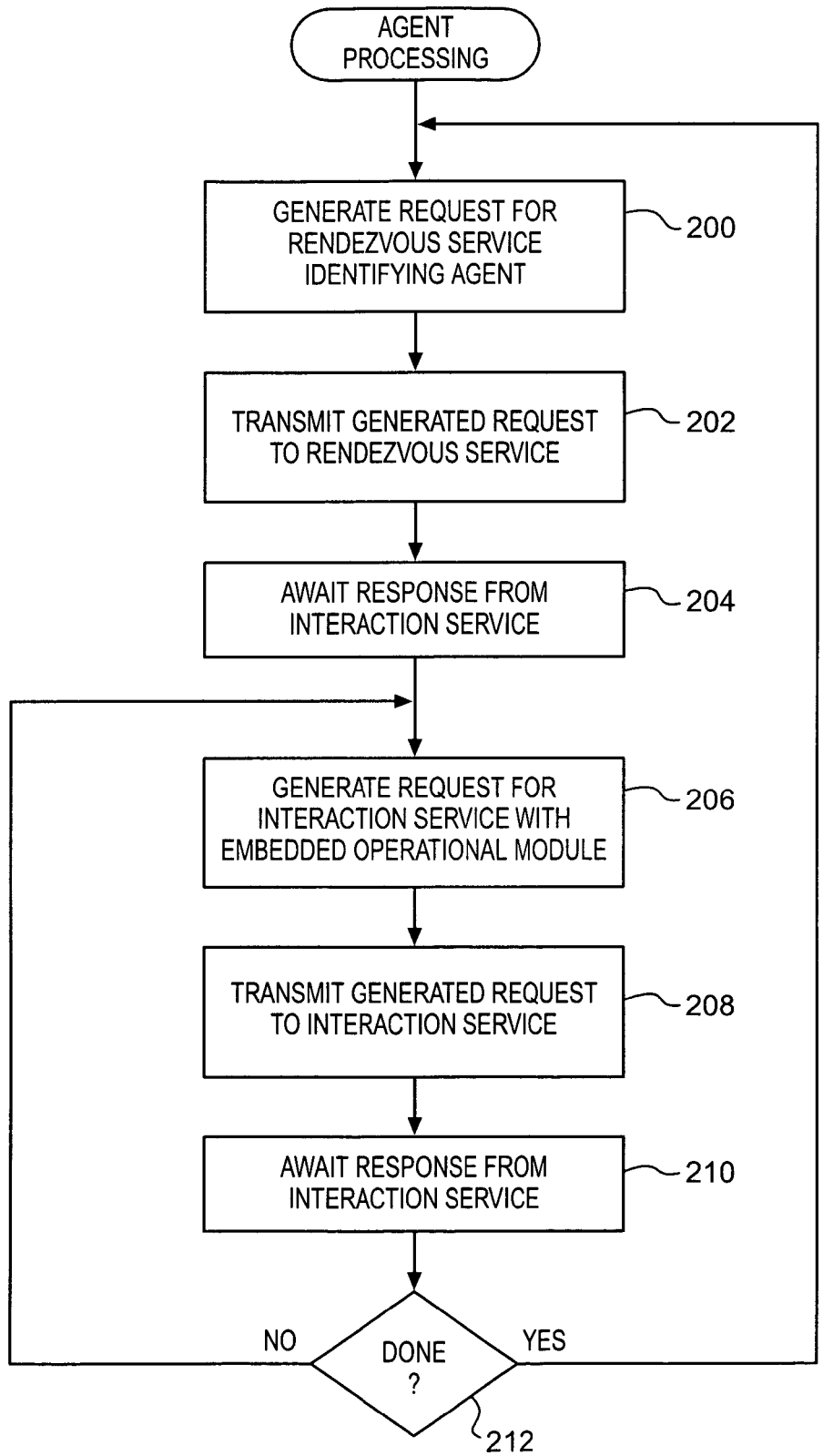
FIG. 2 is a flowchart describing operation of an agent's system in accordance with the present invention.

FIG. 2 is a flowchart describing additional details of the operation of browser 110 on behalf of the a selected agent. Element 200 is first operable to generate a request directed to rendezvous service within the collaboration server system. The generated request identifies the agent operating the browser generating the request. As noted above, the rendezvous service maintains information regarding all such identified support or administrative users presently known to the service. The agent thereby, in effect, "logs in" to the rendezvous service within the collaboration server system. Element 202 then transmits the generated request through any firewall present in the support or administrative premises to the rendezvous service within the collaboration server system. As noted above, well-known design choices may physically situate the collaboration server system within the same site or even the same system as the agent. Such design choices as well as the presence or absence of any firewall protection within the support or administrative premises are well-known to those skilled in the art.

Element 204 then awaits receipt a response from the interaction service indicative of commencement of communications with a particular customer or user in need of support. A computer to computer communications link between the agent (utilizing browser 110) and the requesting customer or user (utilizing browser 108) is thus established. Element 206 then generates a request to interaction service within the collaboration server system. The generated request includes an embedded operational module intended by agent to diagnose and/or manage the remote user's system. Examples of such operational modules may include modules intended to extract certain configuration information from the remote system or to remotely reconfigure parameters of operation of the remote system.

Element 208 then transmits the generated request to the interaction service of the collaboration server system. Element 210 next awaits a response from the interaction service of the collaboration server system. As discussed further below, the request with embedded operational module transmitted to the interaction service is forwarded by the interaction service to the intended remote system (via its support proxy module). Responses generated from the remote system are returned through the support proxy module and the interaction service to the agent's Web browser as a response to the request. The generated response information is analyzed as appropriate for the particular operation module to determine a next step for further diagnosis or configuration. Element 212 then determines whether additional administrative or support functions are required. If the support session is not completed, processing continues by looping back to element 206 and repeating the generation, transmission, and receipt of responses for additional requests with corresponding embedded operational modules. If element 212 determines that no further support or administrative interaction is necessary, processing continues by looping back to element 200 and generating a new request transmitted to the rendezvous service indicating that the administrative or support user is again available to respond to new customer or user requests.

Figure 3:
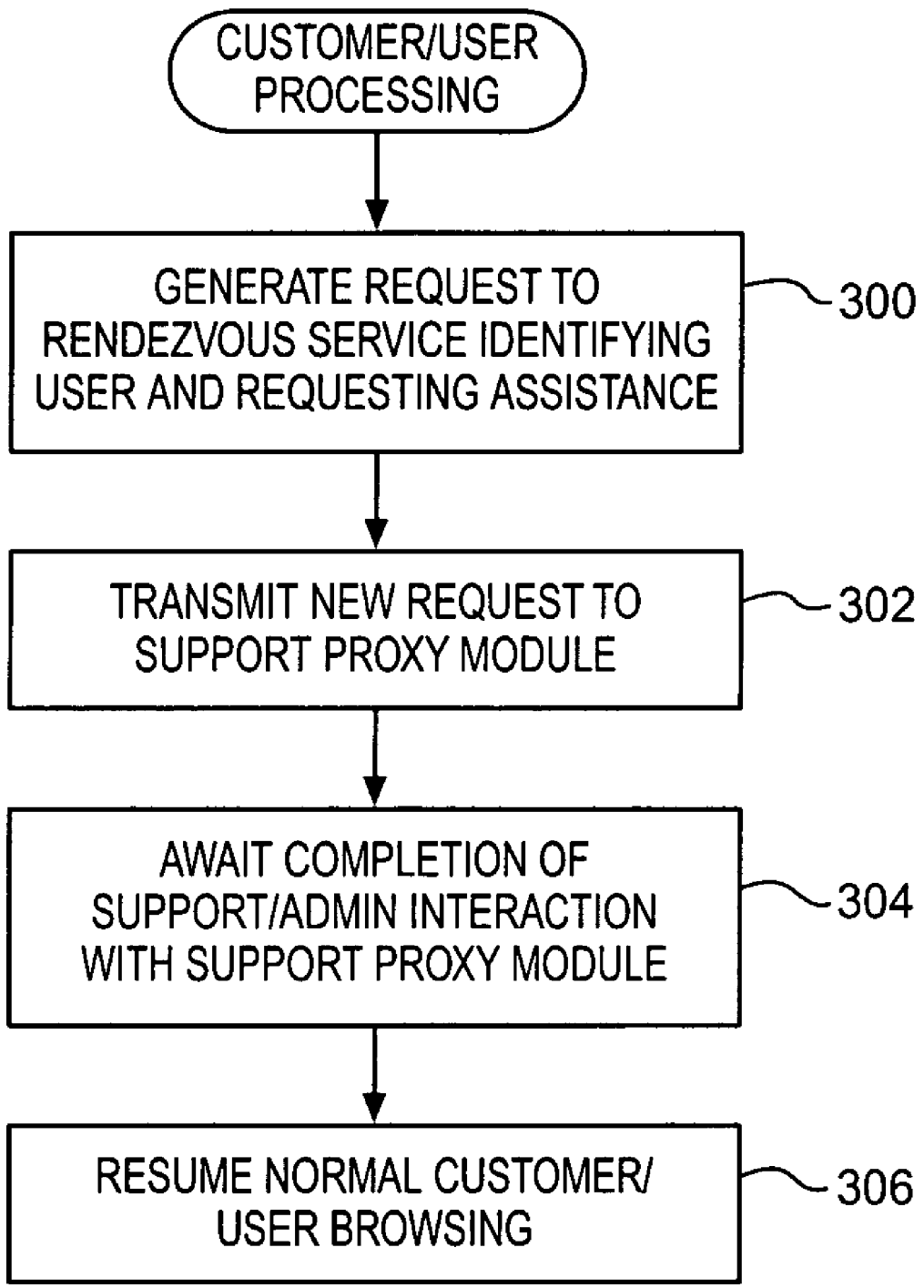
FIG. 3 is a flowchart describing operation of a customer/user system in accordance with the present invention.

FIG. 3 is a flowchart describing operation of the customer or user's remote system through the Web browser 108. As noted above, a user requesting support or administrative services generates an initial request for such services. The support proxy module receives the request and forwards it to the rendezvous service. All further required interaction with the selected agent is managed through the support proxy module. In particular, element 300 is operable to generate a request destined to the rendezvous service identifying the particular user and type of support or administration services needed. Element 302 then transmits the generated request to the support proxy module within the customer premises which, in turn, causes the rendezvous service within the collaboration server system to initiate a computer to computer link with a selected agent. Element 304 then awaits completion of the ongoing interaction with a selected agent.

As noted above, the interaction between the agent's browser and the support proxy (through the interaction service) includes the loading and execution of vendor supplied operational modules for obtaining or modifying operational information regarding the customer's computing premises. This interaction may further include display of status information on the user's Web browser to inform the user of the progress of the agent's interaction with the user's computer. Further, the user's Web browser may offer the user an option of terminating (aborting) the agent's access to the customer's computer. Element 304 includes all such further interaction with the user's computer through the user's Web browser.

When the interaction is completed, element 306 represents resumption of normal processing by the customer or user of Web browser 110.

Figure 4:
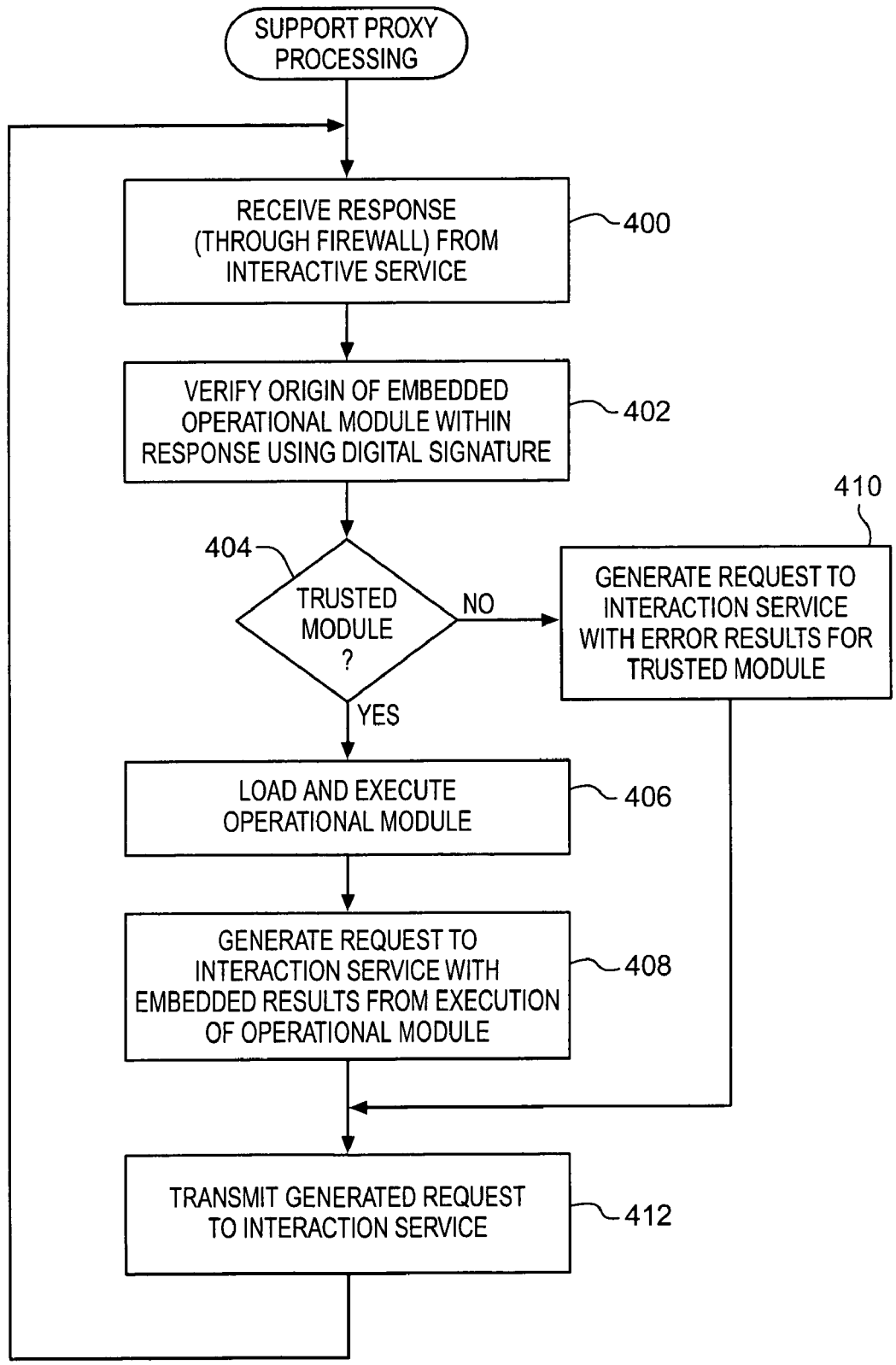
FIG. 4 is a flowchart describing operation of the support proxy module operable in the customer/user system in accordance with the present invention.

FIG. 4 is a flowchart describing the operation of the support proxy module residing within the customer or user's premises for managing interaction with the selected agent. In particular, element 400 is operable to receive a response from the interaction service of the collaboration server system. The response, generated in response to the request transmitted by the user's browser as indicated above in FIG. 3, includes an embedded operational module provided by the remote agent. As noted above, such operational modules are digitally signed to permit verification of the origin of such an embedded operational module. Element 402 therefore verifies the origin of the embedded operational module utilizing the supplied digital signature information. Element 404 then determines whether the verification process identifies a trusted operational module or an operational module from an unknown, untrusted source. If element 404 determines that the operational module is verified as originating from a trusted source (i.e., the vendor of the system or software for which the customer requires support) element 406 is then operable to load and execute the embedded operational module.

As noted above, execution of an operational module may include interaction with the user's Web browser (108 of FIG. 1) to report status and progress of the interaction or to permit the user to impose some controls over the diagnostic and management processing of the operational module. Those skilled in the art will recognize a wide variety of types of operational modules and a wide variety of styles of execution of same with and without user interaction. The operational module itself determines what, if any, user display is required and what level, if any, of control the user may retain over the execution of the operational module. In particular, in the preferred embodiment, the user's Web browser displays status and progress of the operational module processing and presents the user with an "abort button" to terminate the execution of the operational module presently being executed.

Upon completion of the operational module execution, element 408 generates a new request destined for the interaction service of the collaboration server system. The new request includes embedded results from the execution of the supplied operational module. Processing then continues with element 412 as described below to transmit the newly generated request to the interaction service.

If element 404 determines that the embedded operational module is not from a trusted origin, the module is not loaded or executed and element 410 is operable to generate a new request destined to the interaction service of the collaboration server system with embedded error results indicating that the operational module was not loaded and executed due to improper digital signature verification. Processing then continues with element 412 to transmit the newly generated request with embedded response information to the interaction service for appropriate forwarding to the remote agent. Processing then continues by looping back to element 400 to await receipt of another response from the interaction service.

Figure 5:
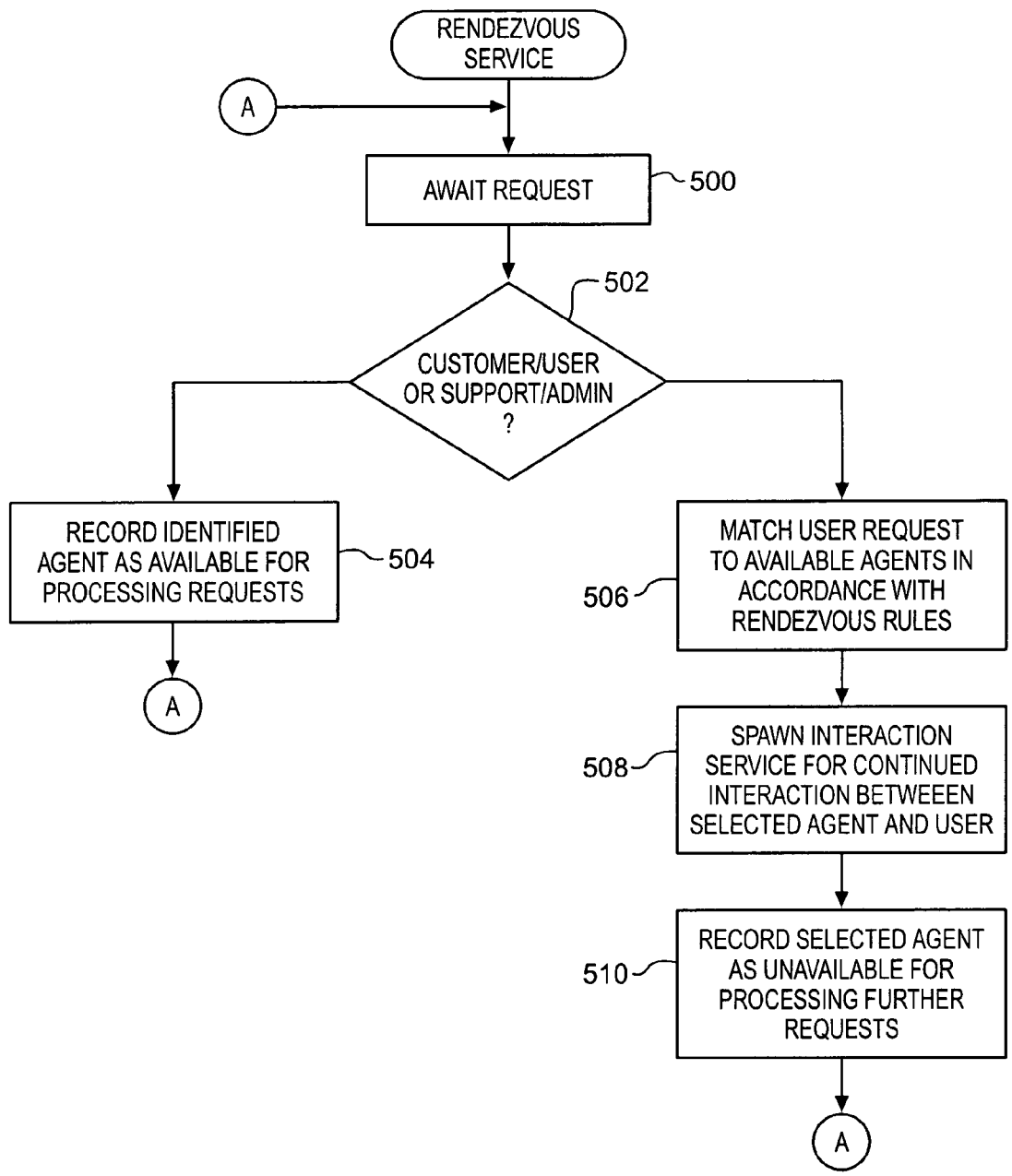
FIG. 5 is a flowchart describing operation of the rendezvous service of the collaboration server in accordance with the present invention.

FIG. 5 is a flowchart describing the operation of the rendezvous service within the collaboration server system. Element 500 is first operable to await receipt of a request from either a user within the customer premises or from an agent in the support/administrative premises. Upon receipt of such a request, element 502 is next operable to determine whether the request is received from a customer (user) or received from an agent. If the request is from an agent, element 504 is next operable to record the identified agent as available for processing of user requests. As noted above, this process effectuates a "log in" procedure to identify available agents for processing of user requests. Processing then continues by looping back to element 500 to await receipt of another request.

If element 502 determines that the received request was generated by a customer or user, element 506 is next operable to match the user request to an available agent in accordance with the rendezvous rules supplied by the vendor or support premises. Exemplary of such rules may be selection based on capability attributes of agents such as expertise in Microsoft Windows 95, 98, NT, 2000, Microsoft Office, WordPerfect, etc. Other exemplary rules or attributes may select an agent based on customer type. For example, large customers may be supported by certain agents while small customers may be serviced by other agents. Any such selection criteria and rules are intended to be within the scope of such rendezvous rules for selection of an appropriate agent by the rendezvous server.

Particular agents or groups of agents may be best suited to handling certain technical matters or may be assigned for handling questions arising from particular customers or users. The matching process performed by element 506 therefore applies whenever rules are applicable to particular support or administrative environment utilizing the features of the present invention. Definition and application of such rules is well-known in the art and need not be further described here.

Having so selected such a qualified available agent, element 508 is next operable to spawn an interaction service process for continued interaction between selected agent and the requesting user. Distinct processes are preferably spawned for each agent/user interaction. The particular spawned process is responsible for managing continued interaction between the particular selected agent and the particular requesting user as identified and matched by the rendezvous service. Those skilled in the art will recognize that a variety of programming techniques may be used to achieve the desired goal of supporting multiple such interactions between agents and users. Spawning an independent process for each such interaction is exemplary of one such well-known programming technique.

Element 510 is operable to record the fact that the selected agent is presently unavailable for further processing of user requests. When the agent is again available for processing of requests, another request will be issued to the rendezvous service as discussed above with respect to element 504. In this exemplary embodiment, an agent interacts with a single user request to completion before commencing processing for another user request. Those skilled in the art will recognize that other programming techniques may be applied to permit a single selected agent to interact with a plurality of requesting users. Each agent may assist a plurality of requesting users either through independent browsers, one each associated with each supported user, or through a single browser interface with multiple displays (frames or windows), one for each supported user. Such options represent well-known design choices for those skilled in the art. Processing then continues by looping back to element 500 to await receipt of further requests from users or from agents.

Figure 6:
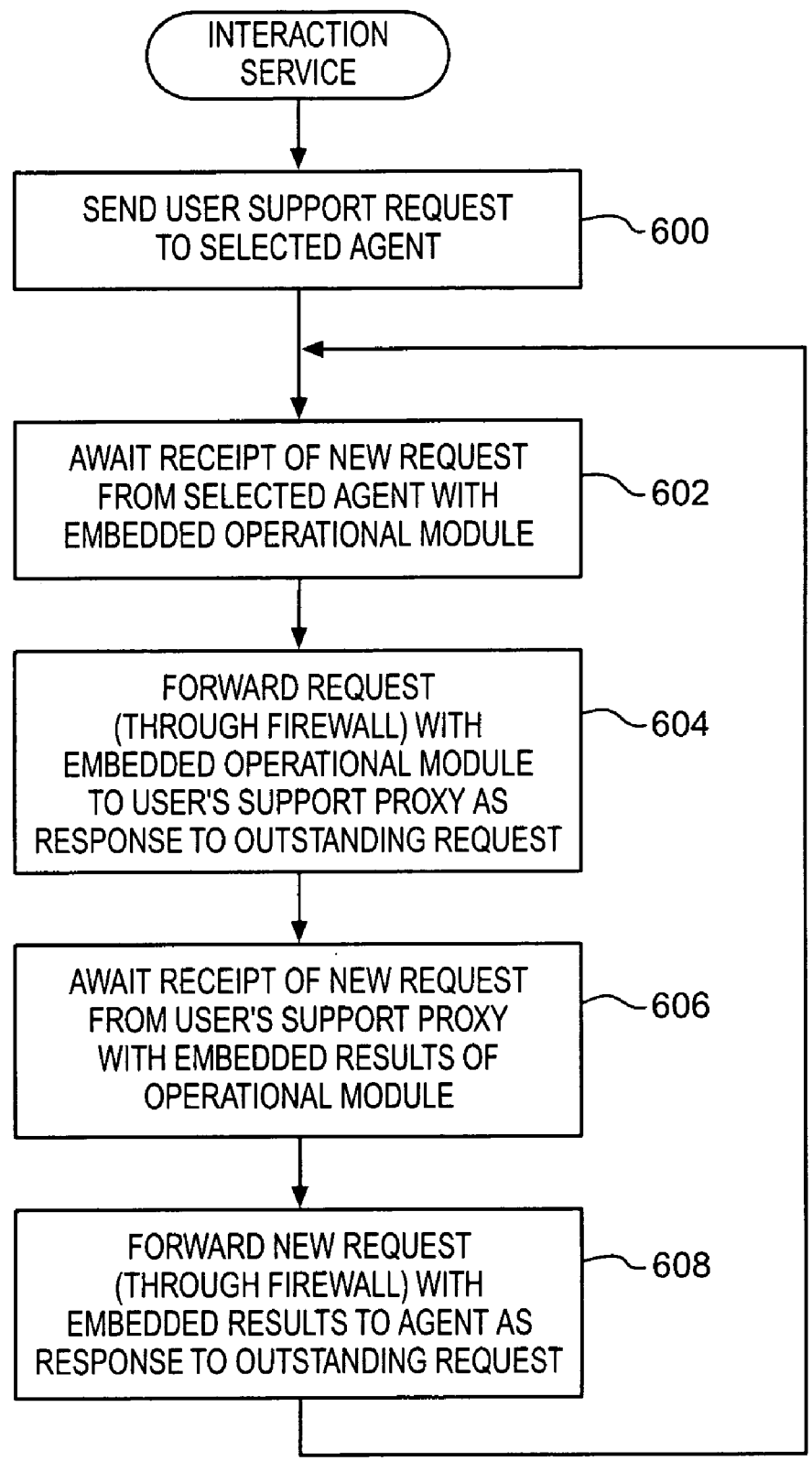
FIG. 6 is a flowchart describing the operation of the interaction service of the collaboration server in accordance with the present invention.

FIG. 6 is a flowchart describing operation of an interaction service spawned by the rendezvous service for processing computer to computer communication requests and responses between a particular selected agent and a particular requesting user. In particular, the interaction service manages communications between a selected agent and the support proxy module operable within the requesting user's premises. As noted above, the interaction service receives requests from either a selected agent or the requesting user (via the support proxy module) and returns responses thereto. The requests and responses so processed embed detailed information used for the selected agent to diagnose and/or configure the requesting user's system. Use of standard HTTP requests and responses permits the communications to pass through firewall communication security systems configured to permit standard Web access.

In particular, element 600 is first operable when initiating interaction between a selected agent and a requesting user to send a support request from a user to the selected agent. The request is forwarded to the selected agent in the form of a response to the agents login request. Element 602 then awaits receipt of a new request from the selected agent having an operational module embedded within. The selected agent determines an appropriate test or configuration sequence to be executed on the requesting user's computer to aid the user in resolving the problems documented by the user's request. As noted above, an operational module may include executable program instructions as well as other commands to be loaded and executed on the user's computer.

Element 604 then forwards the agents request with the embedded operational module to the user's support proxy module in the form of the response to the outstanding request last issued by the support proxy module. Element 606 then awaits receipt of a new request from the user's support proxy module having embedded results of the execution of the supplied operational module. The diagnostic information elicited by the operational module or results of the reconfiguration performed by the operational module is returned by the support proxy module as embedded within its new request. This outstanding request by the user will eventually elicit a new response from the interaction service derived from a newly generated request from the selected agent with yet another embedded operational module. Element 608 then forwards the request received from the support proxy module with embedded results to the selected agent in the form of a response to the outstanding request last received from the agent at element 602. Processing then continues by looping back to element 602 to await receipt of a new request from the selected agent with yet another embedded operational module for further diagnostic testing or reconfiguration of the requesting user's system.

Figure 7:
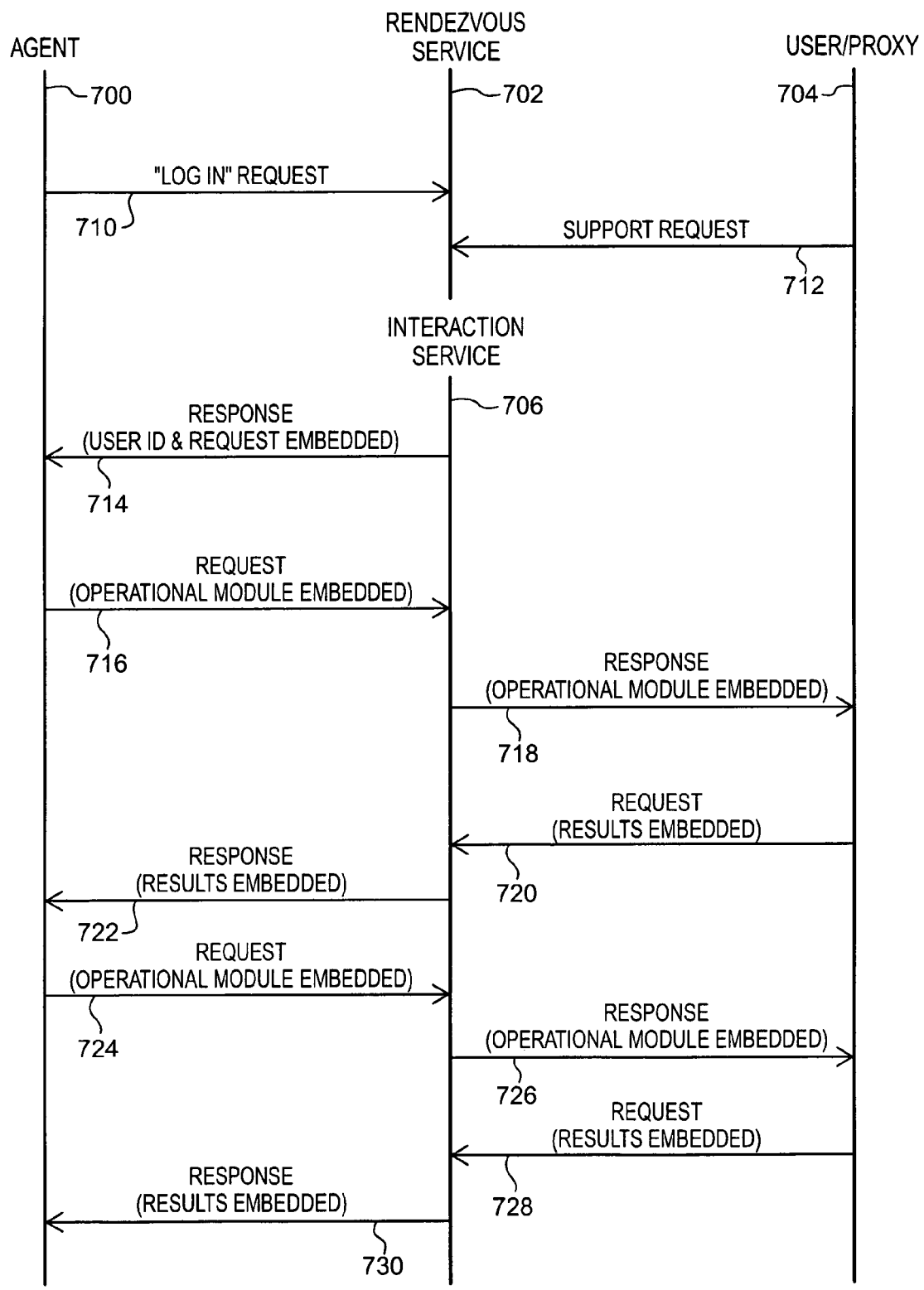
FIG. 7 is a timeline depiction of an exemplary exchange of information between the elements of the system of FIG. 1.

FIG. 7 is a diagram of an exemplary sequence of communications among the various components discussed above. Vertical lines 700 . . . 706 represent timelines in the operation of the agent's system, the rendezvous service, the requesting user's system and the interaction service, respectively. Horizontal directed arrows 710 . . . 730 represent the exchanges of HTTP requests and responses from and to the agent and user as coordinated and processed by the rendezvous service and the interaction service.

Specifically, arrow 710 is an initial request (a "login request") from an agent now available for processing of user requests for support or management. This initial request from an agent effectuates a "log in" of the agent to the rendezvous service. The rendezvous service than records the identified agent as available for processing of user requests. Arrow 712 is an initial request from a user (a "support request") requiring assistance from an appropriate agent. The rendezvous service then matches the user's request to an appropriate agent in accordance with rendezvous rules supplied by the agent's vendor as noted above. Having identified such an agent, the rendezvous service spawns an interaction service process to manage further communications between the selected agent and the requesting user as shown by the start of timeline 706.

The interaction service then returns a response at arrow 714 to the agent's initial request (a "login response") indicated above as arrow 712. This response includes identification information from the requesting user as well as the information regarding the nature of the user's problem.

The agent determines an appropriate action to help resolve the user's problem and sends a new request (a "diagnosis request") at arrow 716 to the interaction service. This new request includes an embedded operational module. As noted above, the operation module is digitally signed to provide assurance to the user that the module is generated by a reliable source and may be executed with assurance of the reputation of the source.

The interaction service forwards the embedded operational module at arrow 718 to the user's system (more precisely to the support proxy module therein) in the form of a response to the user's initial request (a "support response") at arrow 712. This response includes the embedded, digitally signed operational module. The user's system (through the support proxy) verifies the integrity and reliability of the embedded operational module. If so verified, the module is loaded and executed by the support proxy module in the user's system.

Arrow 720 is the return of results from execution of the verified operational module. The results are returned embedded within a next request (a "results request") from the user's system (from the support proxy) to the interaction service. The interaction service at arrow 722 forwards the embedded results to the agent's system as a response (a "diagnosis response") to the outstanding request at arrow 716.

The agent analyzes the results so returned and determines a next appropriate action for assisting the user. A next action is sent at arrow 724 as a next outstanding request with another embedded, digitally signed operational module. The operational module embedded in the new request is forwarded by the interaction service at arrow 726 to the user's system embedded in a response to the outstanding request at arrow 720. As above, the operational module is verified, loaded and executed by the support proxy in the user's system and results returned embedded within a new request at arrow 728. Those results are then forwarded by the interaction service to the agent embedded within a response at arrow 730 to the outstanding request at arrow 724. This process continues until the agent or user terminates further interaction and normal operations resume on both systems.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for securely exchanging information between systems comprising:
    a requesting system coupled to the Internet from which a user requests assistance from a support representative wherein said user utilizes a Web browser client to request said assistance;
    a support representative system coupled to the Internet from which a support representative responds to the requesting user to provide assistance; and
    a collaboration server system coupled to the Internet and accessible to both said requesting system and said support representative system for receiving a request from the user for assistance and for processing said request for assistance wherein said collaboration server system includes:
        a rendezvous service, responsive to receipt of said request for assistance from the user, to initiate communications between the user and the support representative over the Internet between said requesting system and said support representative system in presence of firewall protection in said requesting system and in said support representative system; and
        an interaction service for managing continued interaction between said support representative system and said requesting system in presence of firewall protection in said requesting system and in said support representative system, wherein said requesting system includes a support proxy for receiving from said interaction service a response to said request for assistance and said response includes an operational module that obtains information about the requesting system of the user and transmits the information back to the collaboration server.

2. The system of claim 1 wherein said support proxy loads and executes said operational module.

3. The system of claim 1 wherein said rendezvous service includes:
    a support representative locator for locating said support representative that is a user who responds to said request for assistance.

4. The system of claim 3 wherein said support representative locator includes:
    rendezvous rules; and
    a rules evaluator for selecting said support representative in accordance with said rendezvous rules.

5. The system of claim 1 wherein said operational module includes:
    a digital signature for verifying the origin of said operational module.

6. The system of claim 5 wherein said support proxy verifies the integrity of said operation module using said digital signature.

7. The system of claim 6 wherein said digital signature uses a key of at least 128 bits.

8. A collaboration server system for securely exchanging information between a requesting system and a support representative system, said collaboration server system comprising:
    a rendezvous service, responsive to receipt of a request for assistance generated by a user of a Web browser client operating on said requesting system, to initiate communications via the Internet between said user and support personnel at said support representative system, said requesting system and said support representative system each having firewall protection; and
    an interaction service for managing continued communication between said support personnel and said user in presence of firewall protection at said requesting system and firewall protection at said support representative system, wherein said requesting system includes a support proxy for receiving from said interaction service a response to said request for assistance and said response includes an operational module that obtains information about the requesting system of the user and transmits the information back to the interaction service.

9. The system of claim 8 wherein said support proxy loads and executes said operational module within said requesting system.

10. The system of claim 8 wherein said rendezvous service includes:
    a support representative locator for locating a support representative that is a user who responds to said request for assistance.

11. The system of claim 10 wherein said support representative locator includes:
    rendezvous rules; and
    a rules evaluator for selecting said support representative in accordance with said rendezvous rules.

12. The system of claim 8 wherein said operational module includes:
    a digital signature for verifying the origin of said operational module.

13. The system of claim 12 wherein said support proxy verifies the integrity of said operation module using said digital signature.

14. The system of claim 13 wherein said digital signature uses a key of at least 128 bits.

* * * * *